United States Patent [19]

DeVellis et al.

[11] Patent Number: 4,846,977

[45] Date of Patent: Jul. 11, 1989

[54] METHOD AND DEVICE FOR SEPARATING POLAR FROM NON-POLAR LIQUIDS USING MEMBRANES

[75] Inventors: Robert DeVellis, Pleasant Hill; Lawrence R. Schroeder, Danville; H. Hunter Paalman, Walnut Creek; Curtis M. Tong, Antioch; Terrence L. Caskey, Concord, all of Calif.; Charles W. Martin, Lake Jackson, Tex.

[73] Assignee: The Dow Chemical Company, Midland, Mich.

[21] Appl. No.: 921,940

[22] Filed: Oct. 21, 1986

[51] Int. Cl.$^4$ ............................................. B01D 13/00
[52] U.S. Cl. ................................. 210/640; 210/644; 210/651; 210/21.74
[58] Field of Search ................. 210/640, 321.1, 651, 210/652, 500.23, 644, 321.74, 321.83

[56] References Cited

U.S. PATENT DOCUMENTS

| | | | |
|---|---|---|---|
| 2,953,502 | 9/1960 | Binning | 202/42 |
| 3,228,877 | 1/1966 | Mahon | 210/500.23 X |
| 3,735,558 | 5/1973 | Skarstrom et al. | 55/16 |
| 3,760,949 | 9/1973 | Carey et al. | 210/321 |
| 3,870,637 | 3/1975 | Miyoshi et al. | 210/243 |
| 3,950,247 | 4/1976 | Chiang et al. | 210/640 X |
| 4,025,436 | 5/1977 | Tsuda et al. | 210/321 |
| 4,065,512 | 12/1977 | Cares | 260/641 |
| 4,067,805 | 1/1978 | Chiang et al. | 210/23 |
| 4,141,836 | 2/1979 | Schael | 210/321 |
| 4,207,192 | 6/1980 | Coplan et al. | 210/321 |
| 4,212,744 | 7/1980 | Oota | 210/321 |
| 4,240,907 | 12/1980 | Bently | 210/646 |
| 4,271,900 | 6/1981 | Reitz | 165/162 |
| 4,323,457 | 4/1982 | Sun et al. | 210/645 |
| 4,368,124 | 6/1983 | Brumfield | 210/321 |
| 4,399,288 | 8/1983 | Mc Clure | 210/640 X |
| 4,430,219 | 2/1984 | Kuzumoto et al. | 210/500.23 X |
| 4,448,691 | 5/1984 | Davis | 210/656 |
| 4,500,430 | 2/1985 | Dasgupta | 210/638 |

FOREIGN PATENT DOCUMENTS 180204 10/1983 Japan .
206006 11/1984 Japan .
2139110A 11/1984 United Kingdom .

OTHER PUBLICATIONS

Charles T. Blaisdell and Karl Kammermeyer, "Counter-Current and Co-Current Gas Separation," *Chemical Engineering Science*, 1973, vol. 28, pp. 1249-1255.

*Primary Examiner*—Frank Spear
*Attorney, Agent, or Firm*—Norman L. Sims

[57] ABSTRACT

The invention is a method for separating one or more polar liquids from one or more non-polar liquids which comprises the following steps. First, contacting a mixture comprising one or more polar liquids and one or more non-polar liquids with one side of a membrane comprising a polymer of a perfluorosulfonic acid, or metal salt thereof, which is adapted for selective permeation of the polar liquids over the non-polar liquids under conditions such that the polar liquids selectively permeate through the membrane. Second, passing a desiccant fluid by, pulling a vacuum on, or a combination thereof, the other side of the membrane, under conditions such that the polar liquids which have permeated through the membrane are carried away from the membrane. Third, removing the fluid desiccant containing the permeated polar liquids or the permeated polar liquids wherein a vacuum is used, from the vicinity of the membrane. Fourth, removing the non-polar liquids from the vicinity of the membrane.

Another aspect of this invention is a novel hollow fiber membrane device useful for performing a preferred mode of the above-described method.

This method allows the removal of one or more polar liquids which are dissolved in or entrained in one or more non-polar liquids in a continuous manner which no shoft-term changeout required.

21 Claims, 3 Drawing Sheets

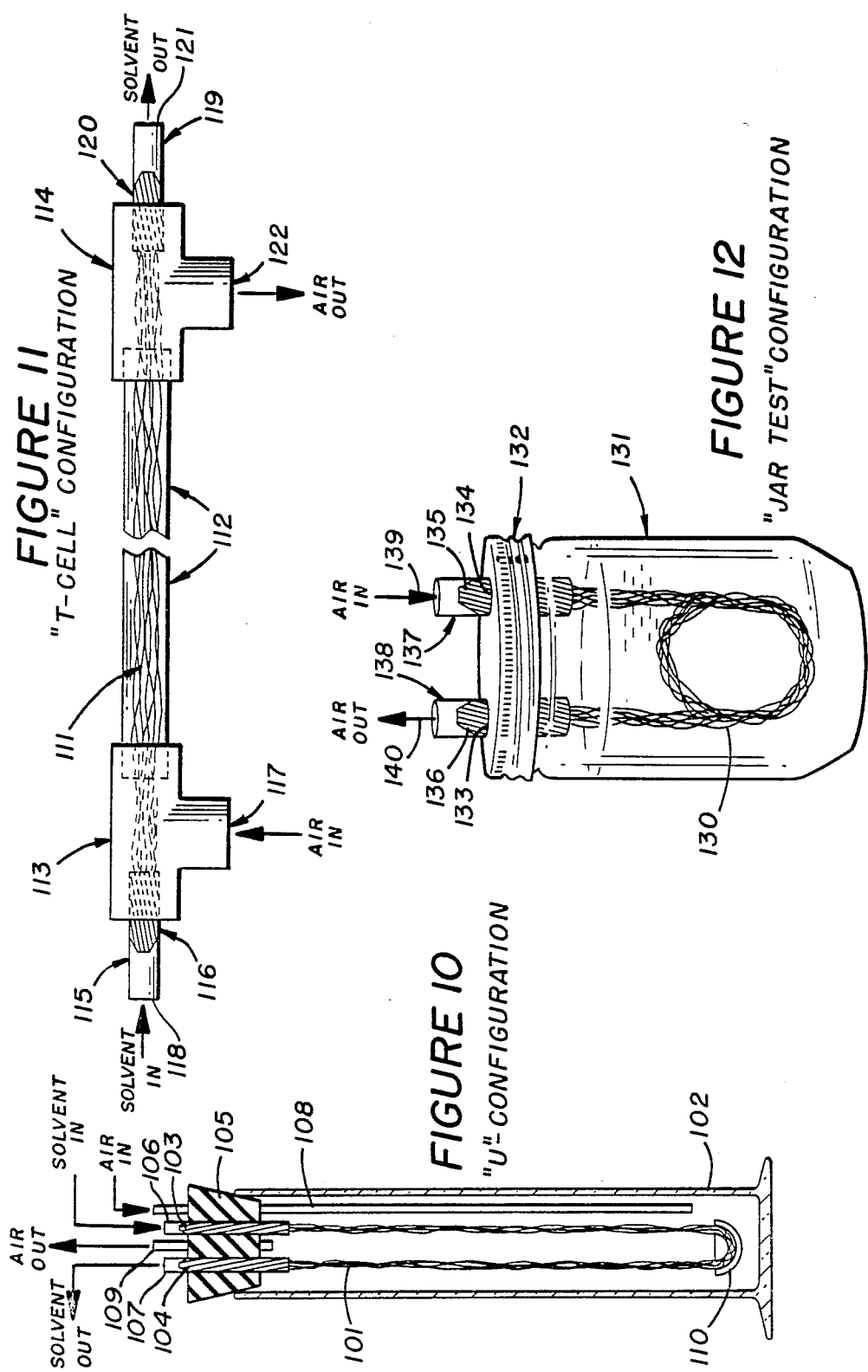

METHOD AND DEVICE FOR SEPARATING POLAR FROM NON-POLAR LIQUIDS USING MEMBRANES

BACKGROUND OF THE INVENTION

This invention relates to a method for separating polar liquids from non-polar liquids. In another aspect, this invention relates to a device for removing polar liquids from non-polar liquids.

In many processes, two or more liquids come into contact with one another. To recover products, recycle reactants or solvents, and the like, the liquids must be separated. Often this requires complex and costly equipment or several processing steps. One method commonly used is distillation. In certain embodiments, the liquids form an azeotrope wherein simple separation methods are inadequate to complete the separation.

Many liquids during use or storage become contaminated with water. The use of such contaminated liquids can result in serious problems, for example, the failure of the liquids to adequately perform their function, corrosion, poison catalysts, and the like. Liquid hydrocarbon fuels commonly pick up water in storage and transfer. The presence of water in such fuels can result in poor performance of engines, corrosion, plugging of fuel lines during periods of extreme cold, and the like. Liquids which are used as solvents very often come in contact with water. Failure to remove such water may reduce the efficacy of such solvents and cause corrosion to the materials with which they come in contact.

Presently, water is removed from liquids by several methods. In one method, the liquid and water are allowed to phase separate and the liquid is separated from the phase separated water by some mechanical means, for example, the use of an overflow discharge system. The problem with this means is that no water dissolved in the liquid is removed, and if such liquid is thereafter exposed to cooler temperatures, additional water may phase separate. Further, such entrained or dissolved water may cause corrosion problems and inhibit the performance of the liquid.

A second means of drying such liquids is by the use of water-adsorbing desiccant materials wherein the liquid is passed over or through such desiccant materials, so that such desiccant materials can remove the water. In many cases these adsorbing desiccant materials do not remove a substantial portion of the water dissolved or entrained in the liquid. Furthermore, such desiccants have a capacity limit and once the desiccant has adsorbed its capacity of water no more water is removed from the liquid. This requires the changing out, or regeneration, of such desiccants. Therefore, the drying process is non-continuous and the changing out or regeneration is time consuming, labor intensive, and costly.

What is needed is a method for separating a polar liquid from a non-polar liquid which is continuous and allows the separation of a polar liquid from a non-polar fluid wherein one component is entrained in or dissolved in the other, for example, wherein the water content is below the water saturation level. What is further needed is a process which does not involve components which require frequent changing out or regeneration.

SUMMARY OF THE INVENTION

The invention is a method for separating one or more polar liquids from one or more non-polar liquids which comprises the following steps. First, contacting a mixture comprising one or more polar liquids and one or more non-polar liquids with one side of a membrane comprising a polymer of a perfluorosulfonic acid, or metal salt thereof, which is adapted for selective permeation of the polar liquids over the non-polar liquids under conditions such that the polar liquids selectively permeate through the membrane. Second, passing a desiccant fluid by, pulling a vacuum on, or a combination thereof, the other side of the membrane, under conditions such that the polar liquids which have permeated through the membrane are carried away from the membrane. Third, removing the fluid desiccant containing the permeated polar liquids or the permeated polar liquids wherein a vacuum is used, from the vicinity of the membrane. Fourth, removing the non-polar liquids from the vicinity of the membrane.

Another aspect of this invention is a novel hollow fiber membrane device useful for performing a preferred mode of the above-described method.

This method allows the removal of one or more polar liquids which are dissolved in or entrained in one or more non-polar liquids in a continuous manner with no short-term changeout required.

BRIEF DESCRIPTION OF FIGURES

FIG. 10 describes the device used in Examples 4-6 and 43-45.

FIG. 11 describes the device used in Examples 39-42 and 46-55.

FIG. 12 describes the device used in Examples 55-66.

DETAILED DESCRIPTION OF INVENTION

Figure 1:
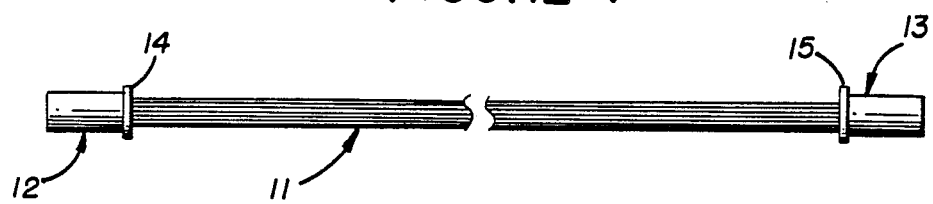
FIG. 1 relates to a preferred hollow fiber bundle design.

The method of this invention is useful for separating one or more polar liquids from one or more non-polar liquids. The method of this invention depends on the relative rates of permeation of polar and non-polar liquids through the membrane. In a membrane separation, the species which permeates through the membrane at a faster rate is called the permeating species, or permeate. The species which permeates through the membrane at a lower rate is the non-permeating species, or non-permeate. By contacting a mixture of the permeate and non-permeate and providing a driving force across the membrane, a stream rich in the permeate results on the other side of the membrane. The permeate in this method is the polar liquids and the non-permeate is the non-polar liquids. Whether certain liquids can be separated depends upon the relative polarity of the liquids which affect the relative rates of permeation. Hansen's three dimensional solubility parameter is a useful guide in determining which liquids may be separated. The Hansen parameters consist of a dispersive component ($S_d$), a polar component ($S_p$), and a hydrogen bond component ($S_h$). In general, those liquids with relatively large values for the polar component ($S_p$) and the hydrogen component ($S_h$) can be separated from liquids with relatively small values of the polar component ($S_p$) and the hydrogen bonding component ($S_h$). The values for the dispersive, polar, and hydrogen component can be calculated and are well documented in the literature (see CRC *Handbook for Solubility Parameters and Other Cohesion Parameters*, AFM Barton, incorporated herein by reference). Those liquids with relatively high values for the polar and hydrogen components would function as the permeate, and those with low values would function as a non-permeate. Polar and non-polar as used herein are relative terms with respect to the other components in a mixture of liquids to be separated. Generally, the relatively polar components are the permeates and the relatively non-polar components are the non-permeants. Whether one or more liquids could be separated from one or more other liquids depends on the relative polarity between the two liquids or groups of liquids and the way in which the process is performed.

Polar liquid as used herein refers to a single polar liquid or to a mixture of two or more polar liquids. Preferred polar components include water and low molecular weight alcohols. More preferred polar components include water and $C_{1-3}$ alcohols, with water being most preferred.

Non-polar liquid as used herein refers to a single non-polar liquid or a mixture of two or more non-polar liquids. Preferred non-polar liquids are halocarbons, halogenated hydrocarbons, hydrocarbons, organic and inorganic acids, ketones, ethers, higher alcohols, aldehydes, and esters. Preferred higher alcohols are $C_4$ or above, or mixtures thereof. More preferred non-polar liquids include halocarbons, halogenated hydrocarbons, hydrocarbons, or mixtures thereof. Halocarbons refer herein to compounds which are perhalogenated carbon compounds. Perhalogenated refers to compounds with carbon backbones wherein all hydrogens have been replaced with halogens. Halogenated hydrocarbons refer to hydrocarbons which are substituted with halogen moieties. Hydrocarbons refer herein to compounds comprising hydrogen and carbon chains, or hydrocarbon rings including aromatic and aliphatic compounds. More preferred non-polar liquids include $C_{1-20}$ halocarbons, $C_{1-20}$ halogenated hydrocarbons, $C_{4-20}$ hydrocarbons, or mixtures thereof. Even more preferred non-polar liquids are straight and branched chain $C_{1-10}$ haloalkanes, $C_{1-20}$ halosubstituted alkanes, $C_{6-10}$ aromatic hydrocarbons, or $C_{4-20}$ alkanes. Even more preferred non-polar liquids are the straight and branched $C_{1-10}$ haloalkanes, $C_{1-10}$ halosubstituted alkanes, or $C_{5-10}$ alkanes. Even more preferred non-polar liquids include methylene chloride, chloroform, carbon tetrachloride, 1,1,2-trichloro-1,2,2-trifluorethane, trichloroethylene, 1,1,2,2-tetrachloroethylene, 1,1,1-trichlorethane, 1,1,2-trichlorethane, 1,2-dichlorethane, 1,2-dibromoenthane, ethyl chloride, ethyl bromide, propylene dichloride, ethylene dibromide, 1,2,4-trichlorobenzene, ortho-dichlorobenzene, chlorobenzene, para-chlorotoluene, or mixtures thereof. Ethers useful in this invention include glycol ethers, cyclic ethers, and dihydrocarbyl ethers. Acids useful in this invention include inorganic acids, carboxylic acids and the like. Preferred acids are the inorganic acids, with mineral acids preferred. Examples of hydrocarbons useful in this invention include pentane, cyclohexane, hexane, heptane, n-octane, isooctane, α-pinene, β-pinene, benzene, and the like. Preferred halocarbons include those perchlorofluorinated perflourinated straight chain aliphatic compounds marketed under the trade mark FREON*. (*Trademark of DuPont.) The non-polar liquids are preferably based on straight or branched carbon chains. A most preferred non-polar liquid is 1,1,1-trichloroethane.

In a preferred embodiment, the method of this invention is useful for separating a substantial amount of water in contact with one or more non-polar liquids from such non-polar liquids. This process can be used to separate from such non-polar liquids that water which is in a separate phase and water dissolved or entrained therein. This method can also be used to break azeotropes between two liquids, for example between water and other non-polar liquids. In one embodiment, a mechanical separation may be performed prior to the use of the method of this invention. For example, phase-separation technique may be used to perform a crude separation of phase-separated water from the non-polar liquid and water dissolved therein so that the process of this invention can be used more efficiently. In another embodiment, the method of this invention can be used to separate most of the water from a non-polar liquid and a desiccant material could be used thereafter to remove some of the remainder. Preferably, water is separated from hydrocarbons, halocarbons, or halogenated hydrocarbons.

Many liquids are used in industry with various additives therein, for example, inhibitors, acid scavengers and acid acceptors. Examples of such additives include low molecular weight alkanols, higher molecular weight alkanols, alkylene oxides and the like. Wherein water is separated from a non-polar liquid, the method of this invention is preferably performed in a manner such that such additives do not permeate along with the water across or through the membrane.

The membranes useful in the method of this invention are perfluorosulfonic acid polymers or metal salts thereof. Examples of such polymers, and methods of preparing such polymers, can be found in the following U.S. patents incorporated herein by reference: U.S. Pat. Nos. 3,282,875; 3,908,378; 4,025,405; 4,065,366; 4,116,888; 4,123,336; 4,126,588; 4,151,052; 4,175,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889;and 4,478,695. See also T. D. Sierke "Perfluorinated Ionomer Membranes" ACS Symposium Series No. 180, pp 386–88 (1982), incorporated herein by reference.

Preferred perfluorosulfonic acid polymers or alkali metal salts thereof comprise backbone units which correspond to the following formula

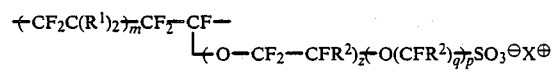

wherein
R[1] is independently in each occurrence fluorine or a $C_{1-10}$ perfluoroalkyl group;
R[2] is independently in each occurrence fluorine or $C_{1-10}$ perfluoroalkyl group;
X is hydrogen or a metal;
z is an integer of from about 0 to about 6;
m is a positive real number of about 5 to about 15;
p is an integer of from about 0 to about 16; and,
q is an integer of from about 1 to about 16.

In the hereinbefore presented formulas, $R^1$ is preferably fluorine or a $C_{1-3}$ perfluorocarbon; more preferably fluorine or a trifluoromethyl group; and most preferably fluorine. $R^2$ is preferably fluorine or a $C_{1-3}$ perfluorocarbon, more preferably fluorine or a trifluoromethyl group, and most preferably fluorine.

X is preferably hydrogen, an alkali metal, alkaline earth metal, a transition metal, or a noble metal. X is more preferably hydrogen or an alkali metal. Preferred alkali metals are sodium and potassium, with sodium being most preferred.

Preferably, z is about 0 to 2. Preferably, q is between about 1 and about 6. Most preferably, q is about 2 to about 4. Preferably, m is between about 5 and 10. Preferably, p is between about 0 and about 6 and most preferably between about 0 and about 2.

The polymers useful in the process of this invention are those which have sufficient mechanical strength to withstand the usage conditions, that is the temperature, pressures, flow rates, and the like, under which these separations take place. Such polymers preferably have an equivalent weight of between about 500 and 2000, more preferably have an equivalent weight of between about 700 and 1500, most preferably between about 800 and 1200.

The polymers useful in this invention can be prepared by polymerizing a monomer of the formula $$CF_2=C(R^1)_2$$

with a monomer of the formula

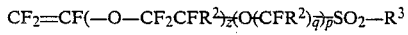

to prepare a polymer of the formula described hereinbefore, wherein $R^3$ is a halogen or —O—X. $R^3$ is preferably a halogen and most preferably fluorine.

In the embodiment wherein $R^3$ is fluorine, the polymer is converted to the hydrolyzed form by contacting with an aqueous alkali metal hydroxide, preferably sodium hydroxide, under conditions such that the $SO_2F$ units undergo hydrolysis to form the alkali metal salt form of the polymer. Preferably, the polymer is hydrolyzed by immersion of the sulfonyl fluoride form of such polymer in an aqueous solution for about 0.5 to 50.0 weight percent metal hydroxide for about 1 to about 48 hours at temperatures of about 20° to 95° C. Thereafter the membrane is rinsed. Preferably, a solution of about 25 percent alkali metal hydroxide in water is contacted with the polymer at about 80° C. for about an hour. The polymer is thereafter soaked in water at elevated temperatures, about 80° C., for a time sufficient to remove all metal hydroxide and fluoride salts. The acid form of the polymer is prepared by contacting the hydrolyzed form of the polymer with concentrated (about 6N) hydrochloric acid at elevated temperatures, about 80°-90° C. The polymer is contacted with the hydrochloric acid for between about 1 and about 48 hours. Thereafter the polymer is rinsed with water to remove the excess hydrochloric acid and the alkali metal salt formed in the process.

In certain embodiments the alkali metal salt of the perfluorosulfonic acid polymer can be converted to another metal salt form by contacting the polymers with an aqueous metal halide, preferably metal chloride at elevated temperatures.

The decision on whether to use the acid form or the perfluorosulfonic acid polymer, or a metal salt form, is dependent upon the particular mixture of non-polar liquids or additives which may be present in the mixture non-polar liquid. The acid or salt form should be chosen to maximize the permeation of the polar liquid and to minimize the permeation of the non-polar liquid and to retain the additives to the non-polar liquid. For example, non-polar liquids containing acid scavengers are preferably dried using an alkali metal salt form of said polymers. Further, the alkali metal salt form is better suited for use wherein higher molecular weight alkanols and alkylene oxides, for example butylene oxide are additives. Chlorinated solvents which have an acid acceptor are preferably dried using the alkali metal salt of the perfluorinated sulfonic acid polymers.

The particular design of the membrane, or device using the membrane, for the separation of polar liquids from non-polar liquids is not critical. Therefore, the membrane may be in any form which allows contacting of the membrane on one side with the liquids to be separated, and contacting on the other side of the membrane a desiccant fluid, a vacuum, or both. Such membrane forms are well known to those skilled in the art and include flat sheet membrane devices, spirally wound devices, hollow fiber membrane devices, tubular membrane devices, and the like. Preferably, the membrane is in a hollow fiber form. Such hollow fibers should have a sufficient wall thickness to stand up to operating conditions but it should not be so thick as to be uneconomical, that is to prevent a reasonable rate of migration or permeation of the polar liquid through the membrane. Preferable wall thicknesses are between about 20 and about 200 microns. A preferred wall thickness is between about 40 and 100 microns. Preferably, the hollow fibers have an outside diameter of between about 100 and about 1200 microns with between about 250 and about 1000 microns being preferred.

The membrane is contacted on the permeate side with a desiccant fluid, a vacuum, or both to carry away the polar liquid permeating through the membrane. Desiccant fluid herein refers to any fluid which can be contacted with the permeate side of the membrane and which has a significantly lower activity with respect to the polar liquids in the mixture of the polar and non-polar liquids in contact with the feed side of the membrane, such that the activity difference provides a driving force for the polar liquids to permeate from the feed side of the membrane to the permeate side. Desiccant fluids include sweep streams. Desiccant fluids include liquids, vapors, and gases with the appropriate activity with respect to the polar fluid. Examples of liquid desiccants include sulfuric acid, triethylene glycol, and calcium chloride brine solution. Gases useful as desiccants include air or inert gases. Examples of inert gases include nitrogen, argon, helium and the like. Vapors useful as desiccants include relatively low boiling non-polar compounds with low permeability across the membrane. The greater the activity difference between the mixture of polar and non-polar liquids and the desiccant fluid with respect to the polar liquid the more effective the separation will be. In the embodiment wherein the polar liquid is water the non-polar liquid is dried, dry liquid refers to a liquid which has a substantially lower water content than the liquid fed or contacted with the membrane. It may be desirable to pass the desiccant fluid through some dryer means before contacting with the membrane through which the water will permeate.

The liquids to be separated may be contacted with the membrane under any conditions which allow the permeation of the polar liquid through the membrane and therefore the separation of the liquids. In one preferred embodiment, the membrane is in a hollow fiber form and the liquid is fed down the bores of the hollow fibers in a manner such that the polar liquid permeates through the hollow fibers and to the outside of said hollow fibers. In such embodiment, it is highly desirable to arrange the hollow fibers in a manner such that good desiccant flow around such hollow fibers is allowed so as to enhance the carrying away of polar liquid permeating to the outside of the hollow fibers, and wherein a gaseous desiccant is used to reduce or prevent the condensation of the liquid on the outside of the fibers.

In another preferred embodiment, the non-polar liquid/polar liquid mixture is contacted with the outside of the hollow fibers, commonly referred to as the shell side, and the desiccant fluid and/or vacuum is fed down or applied to the bore of the hollow fibers. In this embodiment, the polar liquid permeates into the hollow fibers and is taken off from the end of the hollow fibers. The non-polar liquid/polar liquid mixture, which is lower in polar liquid concentration, is removed by a port or fixture in the shell of the device at some distance from the feed.

This process may be operated in a single pass or recirculating liquid mode. In the single pass mode, the mixture of liquids is contacted with the membrane device once to remove a portion of the polar liquid. In a recirculating mode, the mixture of liquids is repeatedly contacted with the membrane. In this mode, the liquid may be contacted with the membrane repeatedly until a particular level of polar liquid in the non-polar is reached.

In the embodiment wherein the polar liquid is water and the recirculating mode is used, the liquid mixture may be preferably contacted with the membrane at a flow rate of between about 1.0 to about 1000 milliliters per minute per square foot of membrane surface area, preferably between about 50 and about 500 milliliters per minute per square foot of membrane surface area. In the single pass mode, the flow rates are more preferably between about 1 and about 200 milliliters of liquid per minute per square foot of membrane surface area, and more preferably, between about 1 and about 50 milliliters of liquid per minute per square foot of membrane surface area. In the above embodiment wherein the desiccant fluid is air or an inert gas with about 5 to about 15 percent relative humidity, such desiccant fluid is preferably contacted with the membrane at a flow rate of between about 0.1 to about 5 cubic feet per minute per square foot of membrane area, more preferably between about 0.1 and about 2 cubic feet per minute per square foot of membrane area, with between about 0.5 and 1.0 cubic feet per minute per square foot of membrane surface area being most preferred.

The temperature of the liquid contacted with the membrane may be any temperature at which the separation of the polar liquid from the non-polar liquid occurs when in contact with the membrane. The temperature at which this process may be used is different for each set of liquids, generally such temperatures are below the boiling point of the liquids and above the temperature at which one liquid is substantially insoluble in the other. Preferred temperatures for the separation of water from halogenated hydrocarbons are between about 15° C. and about 200° C., and most preferably between about 40° C. and about 60° C. The temperature of the desiccant contacted with the membrane may be any temperature at which separation of the polar liquid from the non-polar liquid occurs. A preferred temperature range wherein the polar liquid is water is between about 0° and 100° C., more preferably between about 15° and 40° C., and most preferably between about 20°–25° C. (ambient temperature).

In that embodiment wherein the membrane is in the form of a hollow fiber device, it is preferable that the liquid be introduced into the hollow fibers in a manner such that the pressure of the liquid within the hollow fiber tubes is between about 0 and about 50 psig.

Some non-polar liquids from which water can be separated by this process contain additives such as lower molecular weight alkanols, amines, aldehydes and ketones which permeate through the membrane. It is undesirable to have such compounds permeate through the membrane as they need to be replaced in the non-polar liquids. One means for preventing or significantly preventing this is by recycling desiccant fluid used to remove the water from the membrane after the desiccant fluid has been dried while substantially avoiding the removal of the additives. This recycled desiccant fluid contains a near equilibrium concentration of such components, and this would reduce this unwanted permeation of the components. The separation of the water vapor from the desiccant fluid containing these components can be performed by any process known in the art consistent with minimizing additive removal, for example, by condensing the water on a cold surface in a heat exchanger.

In another aspect, this invention involves a novel device for performing a preferred embodiment of the method described hereinbefore. Such hollow fiber membrane device comprises (A) one or more non-random bundles of hollow fiber membranes comprising a perfluorosulfonic acid polymer, or a metal salt thereof, wherein the hollow fibers have a wall thickness of between 20 and 200 microns, and the hollow fibers are adapted for the selective permeation of one or more polar liquids over one or more non-polar liquids;

(B) one or more tubesheets which comprises a cured thermoset or thermoplastic material which is stable in the presence of the polar liquids and the non-polar liquids, wherein a portion of the bundles of hollow fibers are embedded in one or more tubesheets;

(C) a casing around the bundles of hollow fibers and the tube sheets, wherein the casing is adapted to allow expansion and contraction of the hollow fiber bundles without substantial damage to the fibers;

(D) a means for introducing a mixture comprising the polar liquids and the non-polar liquids to the membrane device;

(E) a means for removing the non-polar liquids, which is at least partially separated from the polar liquid, from the membrane device;

(F) a means for passing a desiccant fluid by, or creating a vacuum on, or both, the face of the membrane opposite of the face in contact with the polar liquid/non-polar liquid mixture, adapted for removing the polar liquids which permeate through the membrane from the membrane device;

(G) a means for removing the desiccant fluid containing permeated polar liquids, or the permeated polar liquids where a vacuum is used alone, from the membrane device.

In one preferred embodiment, the device further comprises a core adopted for supporting the one or more non-random bundles of hollow fibers such that the said bundles can expand and contract during usage without substantial damage.

The hollow fibers of such a device are derived from polymers of perfluorosulfonic acid, or metal salts thereof, as described hereinbefore. The hollow fibers are preferably spun from a perfluorinated sulfonyl fluoride polymer. Such fibers are thereafter cut to the desired length and potted in a tubesheet material, such tubesheet material described hereinafter. In some embodiments, it may be desirable to convert the sulfonyl fluoride moieties to an alkali metal salt of a sulfonic acid or to the sulfonic acid form before potting the fibers. After the hollow fibers are potted in tubesheet material, the hollow fibers, if not previously converted from the sulfonyl flouride form, are contacted with an aqueous solution of an alkali metal hydroxide at elevated temperatures under conditions such that the sulfonyl fluoride moieties are converted to an alkali metal salt of sulfonic acid. Preferably, the fibers are contacted with the aqueous alkali metal hydroxide solution at a temperature of between about 25° and 95° C., more preferably between about 40° and 80° C. Such contacting is generally performed for a time period of between about 1 and 24 hours, more preferably between about 2 and 8 hours. If the acid form of the polymer is desired, the fibers can thereafter be contacted with aqueous HCl. Such contacting is generally performed at a temperature of between about 25° and 95° C., more preferably between about 40° and 80° C. This contacting can occur over a time period of between about 1 and 24 hours, more preferably between about 2 and 8 hours. Generally the contacting occurs under conditions such that the alkali metal salt is converted to the acid form of the sulfonic acid moiety. If another metal form of the polymer is desired the alkali metal salt form of the polymer is contacted with the aqueous metal salt of the desired metal at elevated temperatures. Preferably, the salt is a metal halide, such as a metal chloride.

In the embodiment wherein the fibers are spun from the sulfonyl fluoride form of the polymer, it is preferred to contact the portion of the hollow fiber membranes which will be potted into the tubesheet material with a compound which contains two or more moieties with active hydrogen atoms where at least one moiety will react with a sulfonyl fluoride moiety to form a stable bond prior to contacting the fibers with the tubesheet material and the second such moiety will react with the tubesheet material. Examples of such compounds containing active hydrogen moieties which react with the sulfonyl fluoride moiety are diamines, primary monoamines, amine substituted phenols, phenols with at least two hydroxyl moieties, or two thiol moieties. When a phenol is reacted with the sulfonyl fluoride, a t-amine catalyst is needed or the hydroxyl or thiol moiety must be converted to the salt form. In some embodiments, the tubesheet material is more reactive than the fibers, and a compound which has one moiety which is reactive with the sulfonyl fluroide moieties, and a second moiety which is reactive with the tubesheet material, for example, where the tubesheet material is an epoxy resin, an alkanolamine may be used. Most preferred are the diamines. Such contacting results in the enhanced bonding between such fibers and the tubesheet composition, which is highly desirable, as during the operation of the membrane device such hollow fibers may undergo changes in size due to swelling. Such enhanced bonding prevents or minimizes loss of bonding between the tubesheet and the hollow fibers.

The tubesheet material used in this device can be any thermoplastic or thermoset material which is stable to the particular polar liquids and non-polar liquids to be separated under the operating conditions, and is capable of being bonded to the fiber.

Examples of such materials include artificial and natural rubbers, phenolaldehydes, acrylic resins, polysiloxanes, polyurethanes, fluorocarbons and epoxy resins. Epoxy resins, for example, the diglycidyl ether of bisphenol A reacted with amines or other curing agents, and optionally reactive diluents, fillers and other modifiers are preferred compositions for the fabrication of tubesheets.

Preferably the tubesheets of this invention are prepared from epoxy resins. Any epoxy resin which adheres to a perfluorosulfonic acid polymer, a salt thereof, or a precursor thereof, and provides stability to a hollow fiber membrane device once cured in the manner described hereinafter, can be used in this invention. Polyepoxide resins which are desirable for the resin formulations of this invention include glycidyl polyethers of polyhydric phenols.

Illustrative of the polyhydric phenols are mononuclear phenols and the polynuclear phenols, and included within the latter are the phenol-aldehyde condensation resins commonly known as novolac resins. Typical mononuclear phenols include resorcinol, catechol, hydroquinone, phloroglucinol and the like. Examples of polynuclear phenols include 2,2-bis(4-hydroxyphenyl)-propane(bisphenol A), 4,4'-dihydroxy-benzophenone, 1,1-bis(4-hydroxyphenyl)ethane, bis(2-hydroxynaphthyl)-methane, 2,2-bis(4-hydroxyphenyl)-butane, 4,4'-dihydroxy-phenyl phenyl sulfone and the like. Novolac resins include the condensation products of phenol-formaldehyde and the like.

The preparation of such resins is well known and is described in a number of patents such as U.S. Pat. No. 2,935,488 and others and in textbooks such as Lee and Neville, "Handbook of Epoxy Resins", McGraw-Hill Book Co., 1967 (both incorporated herein by reference).

Preferred epoxy resins are those resins derived from bisphenol A, e.g., diglycidyl ethers of bisphenol A. Such preferred resins generally correspond to the formula

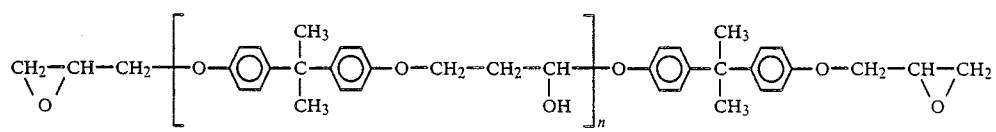

wherein n is a positive real number of between about zero and 6, more preferably between about zero and 4, more preferably between about zero and 1.5. In the discussion hereinafter, all parts with respect to the resin formulation will be based on 100 parts by weight of the epoxy resin (parts per hundred parts of resin, phr).

In one preferred embodiment, the epoxy resin to prepare the tubesheet is an epoxy novolac. In an even more preferred embodiment, the epoxy resin used is a mixture of an epoxy novolac resin and an epoxy resin of bisphenol A. Such mixture is preferably between about 40 and 60 parts of the epoxy novolac, and between about 40 and 60 parts of the epoxy resin of bisphenol A, and most preferably a 50:50 blend.

The epoxy resin is cured with a curing agent such as a polyfunctional amine, e.g., an aromatic diamine, or mixture or adduct of mixtures thereof, anhydrides, and 2,4-dialkylimidazoles. Typical amines include m-phenylenediamine, methylenedianiline, mixtures (including adducts) of m-phenylenediamine and methylenedianiline, diaminodiphenylsulfone, 4-chlorophenylene diamine, and the like. Anhydrides include phthalic anhydride, nadic methyl anhydride, and the like. 2,4-Dialkylimidzaoles include 2-ethyl-4methylimidazoles.

A cyanoethylated polyamine, e.g., ethylene diamine or other aliphatic polyamines modified with acrylonitrile, is particularly preferred as a curing agent. Lee and Neville, Handbook of Epoxy Resins, pp. 7–22 to 7–24 (1967), describes such curing agents. Particularly preferred are the modified polyamines sold by Pacific Anchor Chemical Corporation under the designation AN-CAMINE* 1636 and ANCAMINE* 1922 (diethylene glycol diamino propylether, *trademark of Pacific Anchor Chemical Corporation). The amount of curing agent required depends on its equivalent weight and other factors and can readily be determined empirically. The curing agent ANCAMINE 1922, for example, is advantageously present in from about 15 to about 50, preferably about 25 to about 35, parts per hundred resin by weight. As in the tubesheets, additives, fillers and modifiers may be advantageous in some embodiments.

An optional third component of the tubesheet resin composition is an epoxy curing catalyst. Any known epoxy curing catalyst which enhances the curing of a polyglycidyl ether of a polyhydric phenol with the curing agent may be used. Such catalysts are generally used in catalytic amounts, that is amounts sufficient to enhance the curing of the epoxy resin with the curing agent. Preferably, the catalyst is present in an amount of between about 0.5 and 10 parts per hundred of resin, more preferably between about 0.5 and 4 parts of catalyst per hundred parts of resin, and most preferably between about 1 and 2 parts per hundred parts of resin. Preferred catalysts are tertiary amines, for example, benzyldimethylamine, N,N,N',N'-tetramethylbutanediamine, dimethylaminopropylamine, N-methylmorpholine, N-triethylenediamine, and the like. Generally, where the curing agent is amine based a catalyst is not necessary.

The core of the membrane device functions to support the hollow fiber or hollow fiber bundles. The core can either be a rod, a solid tube, or a perforated tube, provided the core has sufficient mechanical strength to support the hollow fibers, or the hollow fiber bundle, and allows for swelling and elongation of the hollow fibers during use. As disclosed hereinbefore, in one embodiment, it is preferable to feed the polar liquid and non-polar liquid mixture down the bores of the hollow fibers. The desiccant fluid can be contacted with, or the vacuum can be applied to the outside of the hollow fibers in many configurations. The desiccant can be contacted with the hollow fibers in a concurrent flow mode, a countercurrent flow mode, or radial flow mode. The fibers can be arranged with respect to the core in several modes. In one mode, the core acts as a support and the hollow fibers are arranged in a parallel fashion about the core, or in a spiral fashion about the core, and thereafter one or more tubesheets is formed so as to pot the fibers and the core in one sub-assembly. Alternatively, the hollow fibers can be separately potted in one or more tubesheets and thereafter the hollow fiber bundle can be wrapped in a spiral fashion around the core. Alternatively, such a preformed bundle can be passed through an aperture at one end of the core to form a U-shape in the bundle so that both ends of the fiber bundle communicate from the same end of the membrane device. In one preferred embodiment of this particular design, the bundle or bundles can be wrapped in a spiral fashion around the core. In that embodiment where the bundles are preformed, one or more fiber bundles may be used wherein these bundles may be separately wrapped in a spiral manner around the core with ends communicating out of one or more ends of the device.

The casing functions to protect the outside of the membrane device, to contain the desiccant fluid or permeating liquid, or the polar liquid, non-polar liquid mixture and to contain or seal the device from the outside environment. The casing can be made from any material which is stable to the polar and non-polar liquids and the use conditions. In one embodiment, the casing is fit snugly around one or more tubesheets which are formed about the hollow fibers and the core. In another embodiment, the casing is an elongated tube with face plates at either end and one or both of the face plates have apertures within which the tubesheets of prefabricated bundles are fitted. It is important that the casing be adapted to allow the swelling of the hollow fibers without substantial damage to the hollow fibers.

The devices of this invention may be further illustrated by a discussion of the drawings which follow hereinafter.

Figure 5:
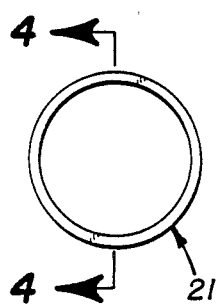
FIGS. 4 and 5 relate to a preferred shell and case design.
Figure 6:
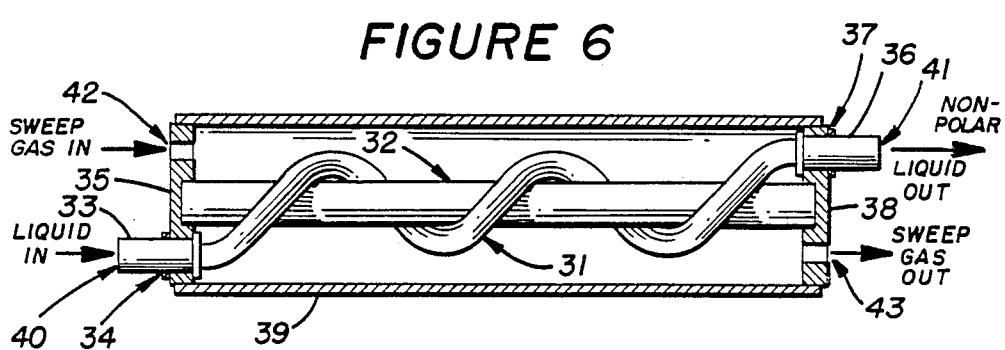
FIG. 6 relates to a preferred hollow fiber membrane device useful in the method of this invention.

FIGS. 1–5 demonstrate sub-assemblies of one preferred device of this invention, and FIG. 6 demonstrates the assembly of such sub-assemblies.

FIG. 1 describes one hollow fiber sub-assembly. FIG. 1 describes the sub-assembly of a fiber bundle. This sub-assembly consists of hollow fibers (11) which are potted into two epoxy tubesheets (12 and 13) wherein the tubesheets each have a lip (14 and 15) formed thereon so as to allow the formation of a seal with the face plate of a casing.

Figure 3:
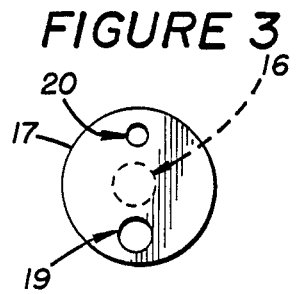
FIGS. 2 and 3 relate to a preferred membrane device core assembly.
Figure 2:
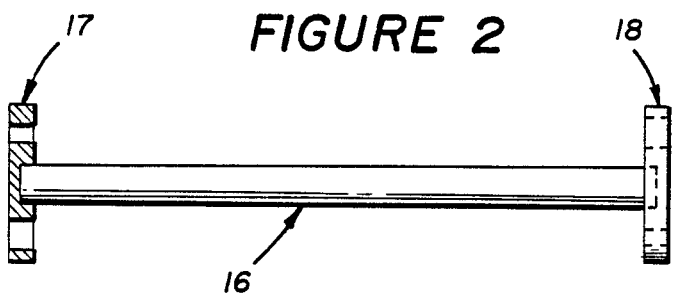

FIG. 2 describes the core sub-assembly. The core assembly contains a tubular rod which functions as the core (16) and a face plate at either end (17 and 18). FIG. 3 shows an end view of one of the face plates (17) wherein the face plate has an aperture for communication of the epoxy resin tubesheet through the face plate (19) and also shows the location of the core (16) and the location of either a desiccant fluid or a polar/non-polar liquid mixture inlet or outlet (20).

Figure 4:
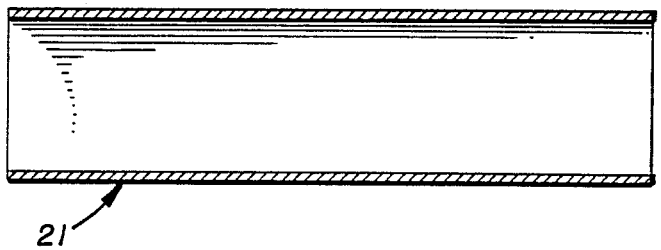

FIGS. 4 and 5 describe the casing. FIG. 4 describes a side view of the shell (21), and in FIG. 5 an end view of the shell (21).

FIG. 6 demonstrates the assembled version of the device, that is the assembly of the components described in FIGS. 1–5. The assembled version comprises a bundle of hollow fibers (31) wound in a spiral manner around the core (32) wherein one tubesheet (33) communicates through an aperture (34) of one face plate

(35) and the tubesheet (36) at the other end of the bundle communicates through an aperture (37) in the face plate (38) at the opposite end of the device. Fitted about the face plates is the casing (39). One tubesheet (33) is adapted with an inlet (40) for the liquids to be separated. The second tubesheet (36) is adapted for the outlet of the non-polar liquid from which at least some of the polar liquid has been separated (41). This device demonstrates a concurrent flow mode. One face plate (35) has an aperture (42) for introduction of desiccant fluid. The second face plate (38) has an aperture (43) adapted for removing the desiccant which has picked up the polar liquid permeating through the hollow fiber membranes, or for a pulling vacuum on the shell side.

Figure 7:
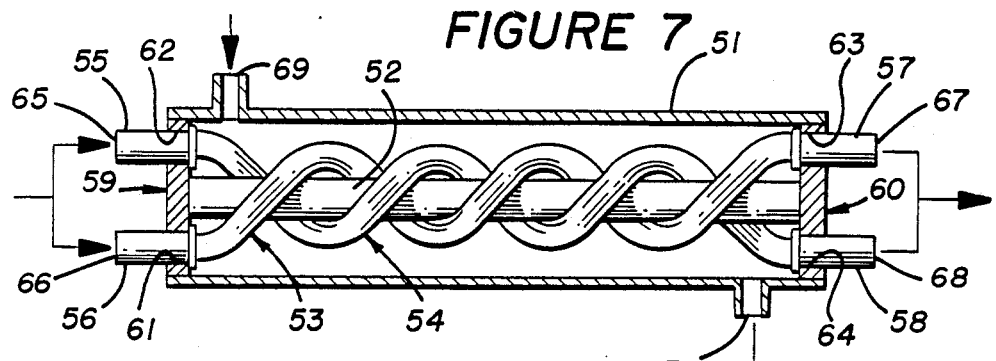
FIGS. 7-9 relate to alternative designs of hollow fiber membrane devices of this invention.

FIG. 7 demonstrates another embodiment of the devices within the scope of this invention, wherein two hollow fiber tubesheet bundles are used and the desiccant fluid is introduced in a manner which allows co-current contact between the desiccant fluid and the hollow fibers through which the liquids to be separated are passed. FIG. 7 demonstrates a device with a casing (51) which encloses the device. The core (52) has wrapped about it two hollow fiber bundles (53) and (54) wherein each hollow fiber bundle has a tubesheet (55, 56, 57 and 58) communicating through each of two face plates (59 and 60) wherein each face plate has two apertures through which the tubesheets communicate (61, 62, 63 and 64). Tubesheets (55 and 56) contain inlets for the liquids to be separated (65 and 66). At the opposite end tubesheets (57 and 58) contain outlets (67 and 68) adapted for allowing non-polar liquids from which at least part of the polar liquid has been separated to leave the membrane device. The desiccant fluid is introduced through inlet (69) in the side of the casing so that the desiccant fluid will flow in a concurrent manner along the hollow fibers. The desiccant fluid containing the permeated polar liquid is taken out of the case through an outlet (70) in the side of the case.

Figure 8:
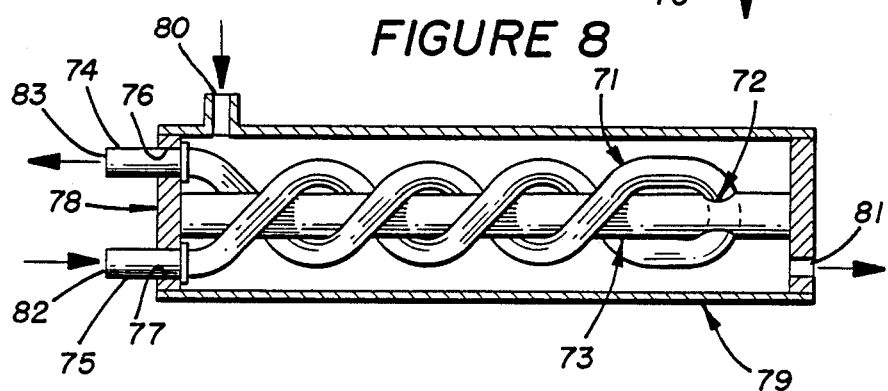

FIG. 8 demonstrates a device wherein the fiber bundle is arranged in a U-shaped manner and is spirally wound about the core. The fiber bundle (71) communicates through an aperture (72) in the core (73) and each half of the fiber bundle is wrapped in a spiral manner around the core and terminates in a tubesheet (74 and 75) wherein each tubesheet communicates through apertures (76 and 77) through the same face plate (78) at one end of the membrane device. Arranged about the device is a casing (79), the inlet for the desiccant fluid (80) is located on the side of the casing and the outlet (81) for the desiccant fluid containing the polar liquid is in the face plate opposite that in which the tubesheets are placed. One tubesheet (75) is adapted for an inlet (82) for the liquids to be separated. The other tubesheet (74) is adapted for an outlet (83) of the non-polar liquid from which at least a portion of the polar liquid has been separated.

Figure 9:
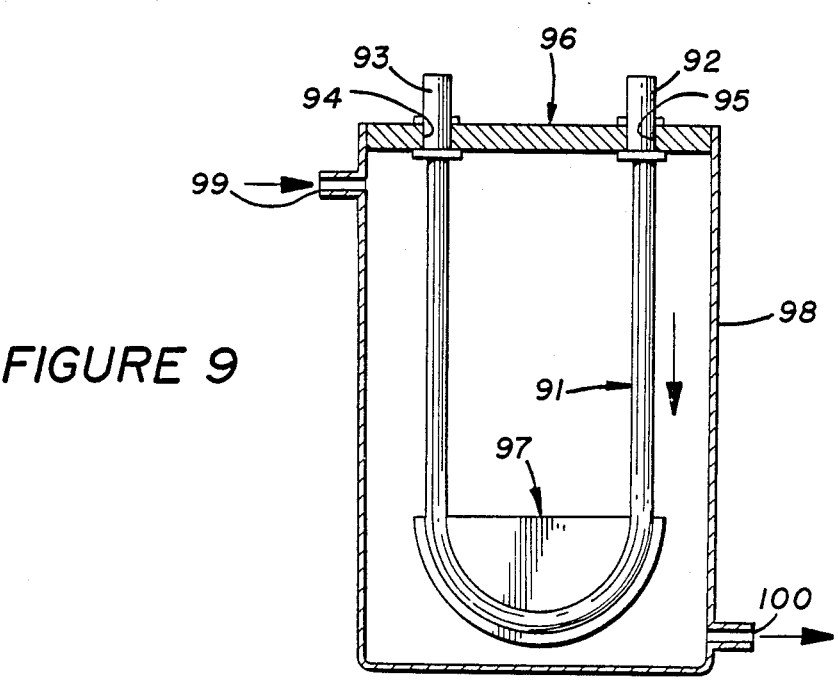

FIG. 9 demonstrates another embodiment of the devices claimed herein. In this embodiment, the hollow fiber bundle (91) is arranged in a U-shaped configuration, with the two tubesheets (92 and 93) communicating through apertures (94 and 95) in a single face plate (96). The fiber bundle is held in the bottom of the device by a support and weight (97). The fiber bundle is enclosed in a pressure case (98), with the face plate (96) on one end. The pressure case (98) has a desiccant fluid inlet (99) and an outlet for the desiccant fluid containing polar liquids, or a port for a pulling vacuum on the device (100). In operation, desiccant fluid is fed into the feed inlet (99) while the desiccant fluid containing polar liquids is removed through the desiccant fluid outlet (100). Alternatively, a vacuum can be pulled on the device using the desiccant fluid outlet (100). During operation, the polar/non-polar liquid mixture is fed down the bores of the bundle of fibers (91) through a tubesheet (92) as the liquid passes through the fiber bundle (91) the polar liquid permeates through the hollow fibers to the shell side of the membrane and such polar liquid is removed through the desiccant fluid outlet (100). The non-polar liquid from which the polar liquid is at least partially separated, exits the device through the end of the fibers (91) potted in the second tubesheet (93).

The devices of this invention can be connected to any machine, device, or storage facility in which a non-polar liquid which needs to have a polar liquid separated therefrom is produced, stored, or used. In one embodiment, the machine or device is a vapor degreaser and the membrane device is used to remove water entrained or dissolved in the solvents used in the vapor degreaser.

SPECIFIC EMBODIMENTS

The following examples are included for illustrative purposes only and do not limit the scope of the invention or the claims. Unless otherwise stated all parts and percentages are by weight. In many of the following examples, samples are removed periodically resulting in a difference between the amounts of certain components between the beginning and the end of the example.

Examples 1-3

Drying of halogenated solvents from a degreaser

A 30 inch long bundle of 250 perfluorosulfonyl fluoride polymer hollow fibers averaging approximately 700 $\mu$ inside diameter (ID)$\times$900 $\mu$ outside diameter (OD) is pre-treated on each end by immersing 2-3 inches into diethylene glycol diaminopropyl ether (AN-CAMINE 1922) for 15-20 minutes, then rinsed with acetone and further rinsed with water to remove excess diamine. The fibers are dried prior to potting the treated portions in a 50/50 mixture by weight of D.E.R.* 331 (a bisphenol A based epoxy resin with an equivalent weight of 182-192), D.E.N.* 438 (an epoxidized phenol formaldehyde novolak resin with an equivalent weight of 176 to 181) (*trademark of The Dow Chemical Company) mixed with 30 parts per hundred of ANCAMINE 1922 curing agent. The tubesheets are allowed to cure overnight at room temperature. The non-potted portions of the bundle are contacted with 25 percent sodium hydroxide at 80° C. for 8-16 hours, followed by soaking in hot water for 1-8 hours to remove excess NaOH and salts. After air drying, the bundle is wrapped spirally around a center core, with the tubesheets extending through holes in the face plates of the core assembly (see FIG. 6), which are also fitted with inlet and exit ports for a sweep gas stream or vacuum. The core assembly is enclosed in a plastic case 4 inches in diameter $\times$ 17 inches long.

The module is installed on a vapor degreasing unit. Feed to the bore-side of the fiber originates from the condensate collection pan from within the degreaser. Only a portion of this stream (approximately ½ to 1/6 estimated, not measured) is actually circulated through the module at a rate of 800-1600 ml/min, while the remainder is rejected back to the degreaser. The product stream, exiting from the fiber bores, is returned to the degreaser.

The sweep stream utilized in this drying application consists either of room air via a blower or compressed air. Flow rates 6-8 cfm are used. This air flow passes by the fibers externally (shell side) in a co-current fashion. Room air relative humidity typically 50 percent while compressed air relative humidity is about 5 percent.

About 70 gal. of solvent are dried for each of three solvents: PRELETE* (trademark of The Dow Chemical Company), FREON* TMS (trademark of DuPont), and CHLOROTHENE SM* (trademark of The Dow Chemical Company.) PRELETE is 90 percent 1,1,1-trichloroethane with the balance consisting of additives (predominantly alcohols). FREON TMS is commercially available from Dupont. CHLOROTHENE SM is 96 percent 1,1,1-trichloroethane with the balance made up of additives.

The experiment consists mainly of loading the degreaser with solvent, adding a measured amount of water to the solvent, allowing the solvent to recirculate through the module, and monitoring the water content of the solvent versus time. The amount of water added is based on room temperature water solubility of solvent so as to saturate the solvent. The results are compiled in Table I.

one hour. This bundle is used to dry FREON TMS in Example 6. Each of the hollow fiber bundles described hereinbefore are arranged and used in a U-shaped configuration as illustrated in FIG. 10. Referring to FIG. 10, the fiber bundle (101) is arranged in a casing (102). For the tests herein, a graduated cylinder is used. The bundle has a tube sheet at either end (103 and 104). The tubesheets (103 and 104) protrude through a cork seal and port holder (105) and one tubesheet (103) contains a feed inlet (106) and the other contains an outlet for the dried solvent (107). A dry air feed tube (108) protrudes through the cork seal and port holder (105) into the casing area. In the center of the cork seal and port holder (105) is an air exit tube (109) for removing the air sweep. The bundle is held in position using a weight support and fiber guide (110). Solvent is pumped from a graduated cylinderical separation funnel through these fibers and returned to the reservoir. Periodic feed samples are taken from the sampling valve on the reservoir, and product samples, as well as flow rate measurements, are taken from the return line to the reservoir.

FREON TMS flow rate is held at 40 and 42 ml/min and the desiccant fluid is compressed air with an air flow is 4.45 liter/minute. The FREON is near saturation with water before use. Approximately 900 ml of solvent is placed in the reservoir for recirculation. The results are compiled in Table II.

TABLE I

| EXAMPLE | SOLVENT | SOLVENT FLOW RATE ml/min. | SWEEP GAS FLOW RATE cfm | AIR SOURCE | SOLVENT TEMP, °F. | ELAPSED TIME (hrs.) | $H_2O$ IN DEGREASER PPMW | DETECTABLE SOLV. IN EXIT AIR |
|---|---|---|---|---|---|---|---|---|
| 1 | PRELETE | 800-1300 ml/min | 6 cfm | Room | 125 | 39.7 | 2245 | — |
|   |   |   |   | Room |   |   | 622 | NO |
| 2 | FREON TMS | 1000-1600 ml/min | 6-7 cfm | Room | 105 | 0 | 1915 | — |
|   |   |   |   | Room |   | 28 | 711 | NO |
|   |   |   |   | Compressed |   | 49.5 | 229 | NO |
| 3 | CHLOROTHENE SM | 1200-1600 ml/min | 6½-7½ cfm | Compressed | 130 | 0 | 1091 | — |
|   |   |   |   | Compressed |   | 28.6 | 141 | NO |

Table I demonstrates that large volumes of solvent (70 gal) can be dried, and that the process works for three different solvents (varying in water content).

Examples 4-6

Drying FREON TMS with different ionic forms of PFSA

A five fiber 900μ OD×700μ 1' long hollow fiber bundle (active length) of the sodium form the perfluorosulfonic acid polymer is prepared as described in Examples 1-3. This bundle is used to dry FREON TMS in Example 4. A five fiber 900μ OD×700μ ID×1 foot of active length long bundle of hollow fibers of the sodium form of the perfluorosulfonic acid polymers prepared as described in Examples 1-3 is converted to the acid form of the perfluorosulfonic acid polymer by immersing in water for one hour at 80° C. Thereafter, the bundle is immersed in 6N HCl at 80° C. for two hours and immersed in water at 80° C. for one hour. This bundle is used to dry FREON TMS in Example 5. A five fiber 900μ OD×700μID×1 foot long bundle of hollow fibers of the sodium form of perfluorosulfonic acid polymer, prepared as described in Examples 1-3, is converted to the potassium form by contacting with an aqueous 21 weight percent potassium chloride solution at 83° C. for 1 hour, then immersed in water at 80° C. for

TABLE II

| EXAMPLE | PFSA IONIC FORM | SOLVENT VOLUME ml | $H_2O$ IN RESERVOIR PPMW[1] | ELAPSED TIME (HRS.) |
|---|---|---|---|---|
| 4 | Na+ | 920 | 2268 | 0 |
|   |   | 760 | 528 | 25.4 |
|   |   | 705 | 95 | 70.2 |
| 5 | H+ | 880 | 2302 | 0 |
|   |   | 710 | 371 | 8.75 |
|   |   | 675 | 25 | 22.6 |
| 6 | K+ | 920 | 2120 | 0 |
|   |   | 840 | 1601 | 21.8 |
|   |   | 740 | 427 | 188.3 |

[1]PPMW means parts per million by weight.

Examples 7-38

Removal of water from a 1,1,1-trichloroethane formulation at varying conditions

A 30 inch long bundle of 50 perfluorosulfonyl fluoride polymer hollow fibers averaging approximately 700 μ ID×900 μ OD is pre-treated on each end by immersing 2-3 inches into diethylene glycol diaminopropyl ether (ANCAMINE 1922) for 15-20 minutes, then rinsed with acetone and further rinsed with water to remove excess diamine. The fibers are dried prior to potting the treated portions in a 50/50 mixture by weight of D.E.R. 331/D.E.N. 438 mixed with 30 parts per hundred of ANCAMINE 1922 curing agent. The tubesheets are allowed to cure overnight at room temperature. The non-potted portions of the bundle are contacted with 25 percent sodium hydroxide at 80° C. for 8–16 hours, followed by soaking in hot water for 1–8 hours to remove excess NaOH and salts. After air drying, the bundle is wrapped spirally around the center core, with the tubesheets extending through holes in the face plates of the core assembly (see FIG. 6), which are also fitted with inlet and exit ports for a sweep gas stream or vacuum. The core assembly is enclosed in a case 2.75 inches diameter × 14 inches long.

This device is used in a series of experiments in which solvent (PRELETE-a mixture comprised of about 90 percent by weight of 1,1,1-trichloroethane) containing various amounts of water is pumped at various rates from a reservoir, down the bores of the hollow fibers, and returned back to the reservoir. A sweep stream of compressed air (atmospheric dew point = −10° to −20° C.) flowing at various rates is introduced externally to the fibers and co-current to the solvent flow, except examples 35, 37, and 38 which use different flow configurations. Solvent and air flow rates are measured by rotameter and positive displacement gas test meter, respectively. Samples of the solvent are taken periodically from a valve at the reservoir outlet, and the water content is determined by coulombmetric Karl Fischer analysis of 200 μl volumes of solvent. The reservoir contains between 10 and 20 liters of solvent at the beginning of each experiment, which level decreases during the experiment due to the volume removed by sampling.

In the first series of experiments, the solvent is heated to 50°–55° C. (to simulate vapor degreaser operations) by passing through a hot water bath prior to the hollow fiber device, and cooled by passing through a chilled bath prior to returning to the reservoir (to minimize evaporation).

The tables give nominal solvent and air flows in ml/min and cubic ft/min, reservoir volumes in liters and water concentrations in parts per million by weight at the start and end of the experiment, and the elapsed time in minutes to reach the ending conditions.

An approximate average water removal rate in mg/min can be calculated from the data in the tables to help in interpreting the effects of the variables. It is the difference in the total water in the reservoir at the start of the experiment versus the end, corrected for water removed by sampling, and divided by the elapsed time as follows:

$$\frac{(V_s \cdot C_s) - (V_\epsilon \cdot C_\epsilon) - (V_s - V_\epsilon) \cdot \frac{C_s + C_\epsilon}{2} \cdot \rho}{\Delta t}$$

wherein $V_s$ is the starting volume, $V_\epsilon$ is the ending volume, $C_s$ is the starting water concentration, $C_\epsilon$ is the ending water concentration, $\rho$ is the solvent density, and $\Delta t$ is the change in time.

The results are given in Tables III–VII. Each table highlights the effect of a different variable. In some tables, data is used from a previous table.

TABLE III
SOLVENT FLOW EFFECT

| EXAMPLE | FEEDFLOW ml/min | AIRFLOW cu. ft./min | START VOL liters | START H$_2$O ppm[1] | END VOL liters | END H$_2$O ppm[1] | ELAPSED TIME (MIN) | RATE mg/min |
|---|---|---|---|---|---|---|---|---|
| 7  | 52  | 0.70 | 12.89 | 1567 | 12.08 | 1264 | 180 | 27 |
| 8  | 200 | 0.70 | 14.12 | 1556 | 13.78 | 1210 | 180 | 34 |
| 9  | 400 | 0.70 | 14.69 | 1583 | 14.32 | 1206 | 180 | 39 |
| 10 | 100 | 1.20 | 18.91 | 1221 | 18.03 | 957  | 400 | 16 |
| 11 | 300 | 1.20 | 18.66 | 1225 | 18.17 | 972  | 270 | 22 |
| 12 | 500 | 1.20 | 14.88 | 1268 | 14.40 | 949  | 240 | 25 |

Table III shows that average water removal rate is better as solvent flow rate increases, with constant air flow and water concentration. One may operate over a fairly broad solvent flow range without affecting drying rate significantly.
[1]Parts per million by weight.

TABLE IV
SWEEP AIR FLOW EFFECTS

| EXAMPLE | FEEDFLOW ml/min | AIRFLOW cu. ft./min | START VOL liters | START H$_2$O ppm | END VOL liters | END H$_2$O ppm | ELAPSED TIME (MIN) | RATE mg/min |
|---|---|---|---|---|---|---|---|---|
| 13 | 200 | 0.10 | 10.90 | 941  | 9.93  | 727  | 380 | 8  |
| 14 | 200 | 0.70 | 11.78 | 906  | 10.97 | 716  | 380 | 7  |
| 15 | 200 | 1.70 | 17.44 | 917  | 16.18 | 720  | 450 | 9  |
| 16 | 300 | 0.10 | 15.47 | 1190 | 15.24 | 1081 | 100 | 22 |
| 17 | 300 | 1.20 | 19.89 | 1233 | 19.12 | 968  | 315 | 21 |
| 18 | 300 | 2.20 | 16.83 | 1264 | 16.24 | 930  | 315 | 23 |
| 19 | 400 | 0.10 | 11.93 | 1525 | 11.56 | 1245 | 150 | 28 |
| *9 | 400 | 0.70 | 14.69 | 1583 | 14.32 | 1206 | 180 | 39 |
| 20 | 400 | 1.70 | 17.41 | 1520 | 16.92 | 1241 | 165 | 39 |

*Example previously used in Table III
Table IV illustrates that increasing the sweep flow has no effect on average removal rate in this range of flow, except at high water removal rates.

TABLE V
STARTING CONCENTRATION EFFECT

| EXAMPLE | FEEDFLOW ml/min | AIRFLOW cu. ft./min | START VOL liters | START H$_2$O ppm | END VOL liters | END H$_2$O ppm | ELAPSED TIME (MIN) | RATE mg/min |
|---|---|---|---|---|---|---|---|---|
| 21 | 200 | 0.70 | 17.93 | 898 | 17.08 | 720 | 420 | 10 |

TABLE V-continued
STARTING CONCENTRATION EFFECT

| EXAMPLE | FEEDFLOW ml/min | AIRFLOW cu. ft./min | START VOL liters | START H₂O ppm | END VOL liters | END H₂O ppm | ELAPSED TIME (MIN) | RATE mg/min |
|---|---|---|---|---|---|---|---|---|
| 8[1] | 200 | 0.70 | 14.12 | 1556 | 13.78 | 1210 | 180 | 34 |
| 15[2] | 200 | 1.70 | 17.44 | 917 | 16.18 | 720 | 450 | 9 |
| 22 | 200 | 1.70 | 19.19 | 1532 | 18.87 | 1230 | 195 | 38 |
| 23 | 400 | 0.70 | 15.89 | 910 | 15.30 | 704 | 380 | 11 |
| 9[3] | 400 | 0.70 | 14.69 | 1583 | 14.32 | 1206 | 180 | 39 |
| 24 | 400 | 1.70 | 18.70 | 930 | 17.83 | 751 | 420 | 10 |
| 20[4] | 400 | 1.70 | 17.41 | 1520 | 16.92 | 1241 | 165 | 37 |
| 25 | 300 | 1.20 | 15.92 | 599 | 14.85 | 478 | 540 | 4 |
| 11[5] | 300 | 1.20 | 18.66 | 1225 | 18.17 | 972 | 270 | 22 |
| 26 | 300 | 1.20 | 14.98 | 1832 | 14.75 | 1505 | 105 | 60 |

[1] Example 8 is used in Table III.
[2] Example 15 is used in Table IV.
[3] Example 9 is used in Table III.
[4] Example 20 is used in Table IV.
[5] Example 11 is used in Table III.

Table V shows the dramatic influence of initial water content of the solvent on average removal rate. A three-fold increase is observed for mid-1500 ppm water vs. 900 ppm, and a greater than ten-fold increase is seen in going from 600 ppm to 1800 ppm. Thus, water is removed faster when there is more water to be removed.

TABLE VI
TEMPERATURE EFFECTS

In the next set of experiments, the temperature of the heating bath is varied to give different module operating temperatures, as noted in the Table.

| EXAMPLE | TEMP °C. | FEEDFLOW ml/min | AIRFLOW cu. ft/min | START VOL liters | START H₂O ppm | END VOL liters | END H₂O ppm | ELAPSED TIME (MIN) | RATE mg/min |
|---|---|---|---|---|---|---|---|---|---|
| 27 | 26.3 | 200 | 0.70 | 15.01 | 1529 | 14.65 | 1237 | 165 | 34 |
| 28 | 37.1 | 200 | 0.70 | 18.03 | 1552 | 17.47 | 1241 | 180 | 39 |
| 8[1] | 50.6 | 200 | 0.70 | 14.12 | 1556 | 13.78 | 1210 | 180 | 34 |
| 29 | 26.6 | 400 | 0.70 | 16.37 | 898 | 15.43 | 739 | 405 | 8 |
| 30 | 40.4 | 400 | 0.70 | 15.08 | 902 | 14.12 | 692 | 420 | 9 |
| 23[2] | 53.1 | 400 | 0.70 | 15.89 | 910 | 15.30 | 704 | 380 | 11 |
| 31 | 23.9 | 200 | 1.70 | 18.42 | 871 | 17.38 | 766 | 415 | 6 |
| 32 | 38.0 | 200 | 1.70 | 17.18 | 918 | 16.15 | 723 | 460 | 9 |
| 15[3] | 50.0 | 200 | 1.70 | 17.44 | 917 | 16.18 | 720 | 450 | 9 |
| 33 | 22.1 | 400 | 1.70 | 17.02 | 1494 | 16.66 | 1233 | 150 | 38 |
| 34 | 40.0 | 400 | 1.70 | 15.92 | 1509 | 15.40 | 1217 | 135 | 44 |
| 20[4] | 52.0 | 400 | 1.70 | 17.41 | 1520 | 16.92 | 1241 | 165 | 37 |

[1] Example 8 is previously used in Tables III and V.
[2] Example 23 is previously used in Table V.
[3] Example 15 is previously used in Tables IV and V.
[4] Example 20 is previously used in Tables IV and V.

Table VI shows little effect of temperature on average removal rate at lower water concentrations over the range 25–55° C., but a slight increase in the 40° range at higher water concentrations. The relatively small temperature effects indicate that the process can be operated at whatever temperature the solvent happens to be at, rather than having to heat or cool it.

TABLE VII
CONFIGURATIONS

In a variation of the experimental conditions, the flow of the air sweep relative to the solvent is changed from co-current to counter-current. In another variation, a perforated inner core is used in the device, and the air sweep is introduced through the core radially outward past the fiber bundle. In the final variation, the sweep gas exit port is capped and a vacuum is pulled on the sweep gas inlet (14 in Hg)

| EXAMPLE | FEEDFLOW ml/min | AIRFLOW cu. ft./min | START VOL liters | START H₂O ppm | END VOL liters | END H₂O ppm | ELAPSED TIME (MIN) | RATE mg/min | CONFIG. |
|---|---|---|---|---|---|---|---|---|---|
| 35 | 400 | 0.05 | 13.63 | 1520 | 13.33 | 1284 | 105 | 39 | Co-Current |
| 36 | 400 | 0.05 | 13.41 | 1544 | 12.82 | 1249 | 120 | 41 | Counter-Current |
| 37 | 400 | 0.05 | 13.26 | 1571 | 12.60 | 1283 | 135 | 35 | Radial Flow |
| 38 | 400 | 0.00 | 13.41 | 1556 | 12.96 | 1272 | 135 | 36 | Vacuum |

Table VI indicates that at these conditions, all configurations are roughly equivalent, with counter-current being slightly preferred. The differences may be accentuated at other sets of conditions (e.g. lower water concentration, lower air flow).

Examples 39–43

Two five fiber bundles of hollow fibers 900μ OD×700μ ID×1 foot long are placed in a "T-cell" with air sweep in co-current fashion or with a vacuum. One bundle is the acid form of the perfluorosulfonic acid polymer, while the other is the sodium form of the perfluorosulfonic acid. The T-cell configuration is illustrated by FIG. 11. The major portion of the fiber bundle (111) is enclosed in a glass tube (112). At either end of the glass tube (112) is a T-fitting (113 and 114). The first T-fitting (113) has one end of the glass tube (112) in one orifice, in a second orifice is one end of a plastic tube (115) which encases one tubesheet (116) of the fiber bundle. The third orifice of the T-fitting (113) is adapted as an air inlet (117). The tubesheet (116) is adapted with a solvent inlet (118) for introduction of the solvent to be dried to the cell. The plastic tube (115) is adapted to allow the introduction of the solvent to the solvent inlet (118). The other end of the glass tube (112) is located in an orifice of a second T-fitting (114). The second T-fitting (114) has fit in its second orifice a second plastic casing (119) which encases a second tubesheet (120) wherein the second tubesheet (120) is adapted with an outlet (121) for the dried solvent, and the plastic case (119) is adapted for removal of the dried solvent. The third orifice of the T-fitting is adapted as an air sweep exit (122) wherein the air into which the water permeated is removed from the cell. A solvent is pumped from a reservoir, through the T-cell, and back into the reservoir. Feed and product samples are taken by syringe from septums in the feed and return lines to minimize contact with moisture. The operating parameters and results are listed in Table VIII.

Example 5 is used to separate water and isopropanol from isooctane. The conditions are as described in Example 5 and the desiccant fluid is expanded compressed air with a relative humidity of about 10 percent. The results are compiled in Table IX.

TABLE IX

| Example | PFSA Ionic Form | Elapsed Time (hr) | Total Volume (ml) | Volume % of Solvent in reservoir | |
|---|---|---|---|---|---|
| | | | | FREON 113 | Methanol |
| 43 | H+ | 0 | 880 | 87.2 | 12.4 |
| | | 4.8 | 760 | 92.7 | 6.9 |
| | | 22.6 | 675 | 99.7 | 0.1 |
| 44 | Na+ | 0 | 920 | 87.3 | 12.3 |
| | | 25.4 | 760 | 92.9 | 6.8 |
| | | 70.2 | 705 | 97.3 | 2.4 |
| | | | | Iso-octane | Iso-propanol | H2O |
| 45 | H+ | 0 | 710 | 47.8 | 46.7 | 5.5 |
| | | 7 | 633 | 50.4 | 45.2 | 4.4 |
| | | 30 | 520 | 57.9 | 40.3 | 1.8 |
| | | 95 | 420 | 66.7 | 33.1 | 0.1 |

TABLE VIII

| EXAMPLE | SOLVENT | PFSA IONIC FORM | SWEEP STREAM | AIRFLOW, 1 pm OR VAC. PRESS. IN Hg. | FEED AIR REL. HUM. % | SOLVENT FLOW, ml/min | SOLVENT VOL. ml | H2O IN RESERVOIR ppmw | ELAPSED TIME (hrs.) |
|---|---|---|---|---|---|---|---|---|---|
| 39 | BENZENE | H+ | Comp. Air | 1.70 | 4.8 | 13 | 110 | 387 | 0 |
| | | | | | | | | 134 | 6.5 |
| 40 | BENZENE | H+ | Vac | 28.8 | — | 13 | 85 | 154 | 0 |
| | | | | | | | | 86 | 10.5 |
| 41 | HEXANE | Na+ | Vac | 29.0 | — | 13 | 170 | 69 | 0 |
| | | | | | | | | 13 | 5.75 |
| 42 | DOWANOL* PMA (Propylene glycol methyl ether acetate) | H+ | Vac | 29.1 | — | 13 | 150 | 9110 | 0 |
| | | | | | | | | 260 | 41.3 |

*DOWANOL is a trademark of The Dow Chemical Company

Examples 43–44

Five fiber hollow fiber bundles of perfluorosulfonic acid polymer and the sodium salt form of perfluorosulfonic acid polymer prepared and arranged as described in Examples 4 and 5 and illustrated in FIG. 10 are used to separate methanol and FREON. The conditions used are the same as used in Examples 4 and 5. The desiccant fluid is expanded compressed air with a relative humidity of about 10 percent. The results are compiled in Table IX.

Example 45

A five fiber hollow fiber bundle of perfluorosulfonic acid polymer prepared and arranged as described in Example 5 is used to separate water and isopropanol from isooctane. The conditions are as described in Example 5 and the desiccant fluid is expanded compressed air with a relative humidity of about 10 percent. The results are compiled in Table IX.

Examples 46–55

Five fiber bundles of hollow fibers of perfluorosulfonic acid polymer and of the sodium salt form of the perfluorosulfonic acid polymer are prepared as described in Examples 4 and 5, and arranged in a T-cell configuration as described in Examples 39–43 and illustrated in FIG. 11, are used to separate water from various liquids. The conditions, liquids and results are compiled in Table X. The permeated water is removed from the permeate side by a vacuum.

TABLE X

| Example | Solvent | PFSA Form | Vacuum (mm Hg) | Solvent Volume (ml) | Solvent Flow Rate (ml/min) | Water Level Initial (ppm) | Water Level Final (ppm) | Elapsed Time (hrs) |
|---|---|---|---|---|---|---|---|---|
| 46 | Carbon Tetrachloride | Na+ | 28.8 | 130 | 12.5 | 63.1 | 12.5 | 21.5 |
| 47 | Perchloro-ethylene | Na+ | 28.8 | 100 | 13.0 | 57.0 | 9.5 | 11.0 |
| 48 | Trichloro-ethylene | Na+ | 28.9 | 125 | 12.0 | 69.9 | 28 | 24.2 |
| 49 | Methylene Chloride | Na+ | 28.9 | 130 | 11.5 | 81.4 | 335 | 21 |
| 50 | Methylene Chloride | H+ | 26.0 | 140 | 13.0 | 81.05 | 83 | 12 |
| 51 | Chloroform | H+ | 26.1 | 135 | 12.0 | 95.8 | 64 | 6 |
| 52 | DOWANOL* PMA[1] | H+ | 27.5 | 115 | 12.5 | 28.4 | 260 | 44 |
| 53 | DOWANOL* PMA[1] | H | 27.5 | 115 | 12.5 | (1.34) | 36 | 55 |
| 54 | Methyl Ethyl Ketone | Na | 27.1 | 125 | 12.0 | .69 | 549 | 18 |

TABLE X-continued

| Example | Solvent | PFSA Form | Vacuum (mm Hg) | Solvent Volume (ml) | Solvent Flow Rate (ml/min) | Water Level Initial (ppm) | Water Level Final (ppm) | Elapsed Time (hrs) |
|---|---|---|---|---|---|---|---|---|
| 55 | Methyl Iso-butenyl Ketone | Na | 27.0 | 140 | 12.0 | 4.86 | 818 | 6 |

[1]DOWANOL* PMA is propylene glycol methyl ether acetate.
*Trademark of The Dow Chemical Company

Examples 56–66

Bundles of five or ten hollow fiber bundles of per-flourosulfonic acid polymer, and the sodium salt form of perfluorosulfonic acid are prepared as described in Examples 4 and 5. The fiber bundles are arranged in a "Jar Test" configuration illustrated by FIG. 12. The fiber bundle (130) is placed in a glass jar (131) in a manner such that the fiber bundle is looped. The jar (131) has a lid (132) which has two aperatures (133 and 134) through which the two tubesheets (135 and 136) protrude. One end of each tubesheet (135 and 136) is placed in the orifice of plastic tubing (137 and 138). One plastic tube (137) is adapted for introducing the desiccant fluid down the bores of the fibers through an inlet (139) in one of the tubesheets (135). A second plastic tube (138) is adapted for removing the desiccant fluid containing the permeated species from an outlet (140) in the second tubesheet (136). The jar lid (132), the tubesheets (135 and 136) and plastic tubes (137 and 138) are connected so as to seal the system from the outside. The solvent to be dried is put in the glass jar (131) and surrounding the fiber bundles.

The desiccant fluid is compressed air expanded to atmospheric conditions with a relative humidity of about ten percent. Table XI demonstrates the results.

with NaOH, and rinsed as described in Example 1–3 and are further contacted with 6N hydrochloric acid at 80° C. for 16 hours, to convert the exposed polymer to the perfluorosulfonic acid form followed by soaking in 80° C. water for 2 hours to remove excess HCl and salt. The bundle is assembled into the "jar test" configuration of FIG. 12, but with sulfuric acid on the outside of the fiber to act as a liquid desiccant fluid to remove the water which permeates through the fibers. 480 ml of solvent (PRELETE—a formulation of 1,1,1-trichloroethane) initially containing approximately 1700 ppm water, is pumped from a reservoir at 12.5 ml/min, down the bores of the hollow fibers, and returned back to the reservoir. Approximately 100 ml of 63.5 percent sulfuric acid solution is used external to the fibers, and is stirred using a magnetic stirrer. Periodic solvent samples are taken by syringe from a septum in the recirculation line to follow the change in water content with time, as determined by coulombmetric Karl Fischer.

For comparison purposes, the same hollow fiber bundle is assembled into the "T-cell" configuration of FIG. 11, and a similar volume of solvent is dried under similar conditions as above, except that a compressed air sweep stream, 6 percent relative humidity, flows at 5 l/min external to the fibers to remove water which permeates. Results of both experiments are compiled in Table XII.

TABLE XI

| Example | Solvent | PSFA Form | Number of Fibers | Water Concentration (ppm) Initial | Water Concentration (ppm) Final | Elapsed Time (hrs) | Volume Solvent (ml) | Air Flow Rate liters/min |
|---|---|---|---|---|---|---|---|---|
| 56 | Toluene | Na+ | 10 | 205 | 111 | 3.25 | 115 | 2.0 |
| 57 | Toluene | H+ | 5 | 205 | 85 | 3.25 | 115 | 1.0 |
| 58 | Methylene chloride | H+ | 5 | 202 | 155 | 7 | 90 | 1.5 |
| 59 | Trichloroethylene | Na+ | 5 | 74 | 22 | 16 | 115 | 1.0 |
| 60 | Trichloroethylene | H+ | 5 | 36 | 25 | 7 | 90 | 1.5 |
| 61 | Perchloroethylene | Na+ | 5 | 22 | 11 | 6.5 | 80 | 1.4 |
| 62 | Perchloroethylene | H+ | 5 | 20 | 8 | 6.5 | 80 | 1.3 |
| 63 | Carbon Tetrachloride | Na+ | 5 | 40 | 21 | 7 | 80 | 1.9 |
| 64 | Carbon Tetrachloride | H+ | 5 | 38 | 17 | 7 | 80 | 1.3 |
| 65 | 1,2-dichloroethane | Na+ | 5 | 345 | 279 | 53 | 70 | 1.9 |
| 66 | 1,2-dichloroethane | H+ | 5 | 356 | 226 | 53 | 65 | 1.3 |

Examples 55–66 demonstrate that the method and devices of this invention may be used with a shell side feed of liquids to be separated.

Example 67

Removal of water from a 1,1,1-trichloroethane formulation using a liquid desiccant fluid Five hollow fibers of perfluorosulfonyl fluoride polymer approximately 700 μ ID × 900 μ OD and 16 inches long are pre-treated, potted into a bundle, contacted

TABLE XII

| Minutes | Sweep Stream | Water in Solvent (ppm) | Sweep Stream | Water in Solvent (ppm) |
|---|---|---|---|---|
| 0 | H2SO4 63.5% | 1692 | air[1] | 1704 |
| 30 | | 1451 | | 1373 |
| 60 | | 1245 | | 1245 |
| 120 | | 949 | | 1011 |
| 180 | | 805 | | 898 |

TABLE XII-continued

| Minutes | Sweep Stream | Water in Solvent (ppm) | Sweep Stream | Water in Solvent (ppm) |
|---|---|---|---|---|
| 240 | | 712 | | 766 |

[1]At 6% relative humidity

What is claimed is:

1. A hollow fiber membrane device which comprises
(A) one or more non-random bundles of hollow fiber membranes comprising a perfluorosulfonic acid polymer, or a metal salt thereof, wherein the hollow fibers have a wall thickness of between 20 and 200 microns, and the hollow fibers are adapted for the selective permeation of one or more polar liquids over one or more non-polar liquids;
(B) one or more tubesheets which comprises a cured thermoset or thermoplastic material which is stable in the presence of the polar liquids and the non-polar liquids wherein a portion of the bundles of hollow fibers are embeddded in one or more tubesheets;
(C) a casing around the bundles of hollow fibers and the tubesheets of such bundles, wherein the casing is constructed and arranged to allow expansion and contraction of the hollow fibers without substantial damage to the fibers;
(D) a means for introducing a mixture comprising the non-polar liquids and the polar liquids to the membrane device;
(E) a means for removing non-polar liquids, which are at least partially separated from the polar liquids, from the membrane device;
(F) a means for passing a desiccant fluid by, creating a vacuum on, or both, the side of the membrane opposite of the side in contact with the mixture of polar liquids and non-polar liquids, adapted for removing the polar liquids which permeates through the membrane from the membrane device;
(G) a means for removing the desiccant fluid containing permeated polar liquids, or the permeated polar liquids where a vacuum is used alone, from the membrane device.

2. A membrane device of claim 1 which further comprises a core adapted for supporting the one or more non-random bundles of hollow fibers such that said bundles can expand and contract during usage without substantial damage to the fibers.

3. The membrane device of claim 2 wherein the polymer of perfluorosulfonic acid, or a metal salt thereof, comprises units which correspond to the formula

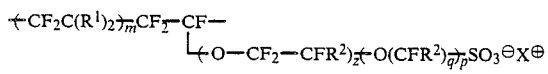

wherein
$R^1$ is independently in each occurrence fluorine or a $C_{1-10}$ perfluoroalkyl group;
$R^2$ is independently in each occurrence flourine or a $C_{1-10}$ perfluoroalkyl group;
X is hydrogen or a metal;
z is an integer of from about 0 to about 6;
m is a positive real number of about 5 to about 15;
p is an integer of from about 0 to about 16; and,
q is an integer of from about 1 to about 16.

4. The membrane device of claim 3 wherein the hollow fibers are initially prepared from a perfluorosulfonyl fluoride polymer and the portion of such fibers which is to be contacted with the tubesheet composition is contacted with a compound with two or more moieties with active hydrogen atoms prior to contacting with the tubesheet composition, wherein at least one of the active hydrogen moieties forms a stable bond with the sulfonyl fluoride moiety, and at least one of such moiety forms a stable bond with the tubesheet composition.

5. A membrane device of claim 2 wherein the tubesheet composition comprises a polyglycidyl ether of a polyhydric phenol, or resin thereof, and a curing agent.

6. A membrane device of claim 2 wherein the tubesheet comprises
(A) an epoxy resin mixture comprising
(i) an epoxy resin derived from the condensation of a polyhydric phenol and formaldehyde; and
(ii) an epoxy resin derived from a polyhydric phenol which is not a condensation product of a polyhydric phenol and formaldehyde; and
(B) a curing agent comprising polyamine.

7. The membrane device of claim 2 wherein the means for introducing a mixture comprising the polar liquids and non-polar liquids to the membrane device is adapted for introducing the mixture into the bores of the hollow fibers; and
the means for removing the non-polar liquids, which is at least partially separated from the polar liquids, from the membrane device is adapted for removing such non-polar liquids from the bores of the hollow fibers;
the means for introducing desiccant fluid into or applying a vacuum to the membrane device is adapted for introducing the desiccant fluid on, or applying the vacuum to, the shell side of the hollow fibers; and
the means for removing the desiccant fluid containing the permeated polar liquid, or the permeated polar liquid, is adapted for removing such from the shell side.

8. The membrane device of claim 7 wherein one or more of the non-random bundle of hollow fibers is wrapped in a spiral arrangement around the core.

9. The membrane device of claim 8 wherein each fiber bundle has a tubesheet at either end.

10. The membrane device of claim 9 which comprises two or more fiber bundles.

11. The membrane device of claim 10 wherein the casing comprises a hollow cylinder with a face plate on either end wherein each face plate has one or more apertures adapted for holding one or more tubesheets of the one or more fiber bundles.

12. A method for separating one or more polar liquids from one or more non-polar liquids which comprises:
(A) contacting a mixture comprising one or more non-polar liquids and one or more polar liquids with one side of a membrane comprising a polymer of a perfluorosulfonic acid or metal salt thereof which is adapted for selective permeation of the polar liquids over the non-polar liquids under conditions such that the polar liquid selectively permeate through the membrane;
(B) passing a desiccant fluid by, applying a vacuum to, or both, the other side of the membrane under conditions such that the polar liquids which have permeated through the membrane are carried away from the membrane;

(C) removing the desiccant fluid containing the permeated polar liquids, or removing the permeated polar liquids from the vicinity of the membrane; and (D) removing the non-polar liquids from the vicinity of the membrane;

wherein the process is performed using a membrane device which comprises (1) one or more non-random bundles of hollow fibers having a wall thickness of between 20 and 200 microns;

(2) one or more tubesheets which comprises a cured thermoset or thermoplastic material which is stable in the presence of the polar liquids and the non-polar liquids wherein a portion of the bundles of the hollow fibers is embedded in one or more tubesheets;

(3) a casing around the bundles of hollow fibers and the tubesheets, wherein the casing is constructed and arranged to allow expansion and contraction of the hollow fiber bundles without substantial damage to the fibers.

13. The method of claim 12 wherein the hollow fibers are arranged about a core adapted for supporting the one or more non-random bundles of hollow fibers such that said bundles can expand and contract during usage without substantial damage.

14. The method of claim 13 wherein the polymer of perfluorosulfonic acid or a metal salt thereof comprises units which correspond to the formula $$\mathrm{+CF_2C(R^1)_2}\overline{)_m}\mathrm{CF_2-CF-} \atop \mathrm{L_{+O-CF_2-CFR^2)_z+O(CFR^2)_q^{+}{_p}SO_3^{\ominus}X^{\oplus}}}$$

wherein

R$^1$ is independently in each occurrence fluorine or a C$_{1-10}$ perfluoroalkyl group;

R$^2$ is independently in each occurrence flourine or C$_{1-10}$ perfluoroalkyl group;

X is a hydrogen or a metal;

z is an integer of from about 0 to about 6;

m is a positive real number of about 5 to about 15;

p is an integer of from about 0 to about 16; and, q is an integer of from about 1 to about 16.

15. The method of claim 14 wherein the polar liquid comprises water or C$_{1-3}$ alcohol, or mixtures thereof.

16. The method of claim 15 wherein the polar liquid comprises water.

17. Them method of claim 16 wherein the non-polar liquid comprises a C$_{1-20}$ halocarbon, C$_{1-20}$ halogenated hydrocarbon, C$_{5-20}$ hydrocarbon, or mixtures thereof.

18. The method of claim 17 wherein the non-polar liquid comprises methylene chloride, chloroform, carbon tetrachloride, 1,1,2-tricholoro-1,2,2-trifluoroethane, trichloroethylene, 1,1,2,2-tetrachloroethylene, 1,1,2,2-tetrachloroethane, 1,1,1-trichloroethane, 1,1,2-trichloroethane, 1,2-dichloroethane, 1,2-dibromethane, ethyl chloride, ethyl bromide, ethylene dibromide, propylene dichloride, 1,2,4-trichlorobenzene, o-dichlorobenzene, chlorobenzene, or p-chlorotoluene, or mixtures thereof.

19. The method of claim 18 wherein the mixture of the polar liquid and the non-polar liquid is introduced into and flowed down the bore of the hollow fibers, and the desiccant fluid is passed over, the vacuum is applied to, or both, the outside of the hollow fibers.

20. The method of claim 18 wherein the desiccant fluid is introduced to, the vacuum is applied to, or both, the bores of the hollow fibers and the mixture of the polar liquid and non-polar liquids are contacted with the outside of the fibers.

21. The method of claim 13 wherein one or more of the non-random bundles of hollow fibers is wrapped in a spiral arrangement around the core.

* * * * *

UNITED STATES PATENT AND TRADEMARK OFFICE
CERTIFICATE OF CORRECTION

PATENT NO. : 4,846,977         Page 1 of 4

DATED : July 11, 1989

INVENTOR(S) : Robert DeVellis et al.

It is certified that error appears in the above-identified patent and that said Letters Patent is hereby corrected as shown below:

On cover sheet, under "ABSTRACT," in the last paragraph, in the next to the last line, delete "which and insert -- with --;

Col. 1, line 62 delete "fluid" and insert -- liquid --;

Col. 2, line 44, delete "55" and insert -- 56 --;

Col. 3, line 50, after "branched" insert -- chain --;

Col. 3, line 56, "1,2-dibromoethane" has been misspelled;

Col. 4, line 1, "perfluorinated" has been misspelled;

Col. 4, line 42, delete "4,175,215" and insert -- 4,176,215 --;

UNITED STATES PATENT AND TRADEMARK OFFICE
CERTIFICATE OF CORRECTION

PATENT NO. : 4,846,977

DATED : July 11, 1989

INVENTOR(S) : Robert DeVellis et al.

It is certified that error appears in the above-identified patent and that said Letters Patent is hereby corrected as shown below:

Col. 5, line 44, delete "for" and insert -- of --;

Col. 5, line 66, delete "or" and insert -- of --;

Col. 5, line 67, delete "polymer" and insert -- polymers --;

Col. 6, line 50, delete "fluid" and insert -- liquid --;

Col. 7, line 52, delete "0.1" and insert --0.01--;

Col. 11, line 20, "Dialkylimidazoles" has been misspelled;

Col. 11, line 20, after "2-ethyl-4" insert a hyphen;

Col. 13, line 67, before "port" delete "a";

Col. 16, line 19, after "from" delete "the" and insert -- a --;

UNITED STATES PATENT AND TRADEMARK OFFICE
CERTIFICATE OF CORRECTION

PATENT NO. : 4,846,977        Page 3 of 4

DATED : July 11, 1989

INVENTOR(S) : Robert DeVellis et al.

It is certified that error appears in the above-identified patent and that said Letters Patent is hereby corrected as shown below:

Col. 17, line 8, after "around" delete "the" and insert -- a --;

Col. 25, line 20, "embeddded" has been misspelled;

Col. 26, line 6 delete "of";

Col. 26, line 20 after "comprising" insert -- a --;

UNITED STATES PATENT AND TRADEMARK OFFICE
CERTIFICATE OF CORRECTION

PATENT NO.  :  4,846,977
DATED       :  July 11, 1989
INVENTOR(S) :  Robert DeVellis et al.

It is certified that error appears in the above-identified patent and that said Letters Patent is hereby corrected as shown below:

Col. 26, line 61, delete "liquid" and insert -- liquids --;

Col. 28, line 12, delete "Them" and insert -- The --;

Col. 28, line 20, "1,2-dibromoethane" has been misspelled.

Signed and Sealed this

Eighteenth Day of February, 1992

*Attest:*

HARRY F. MANBECK, JR.

*Attesting Officer*      *Commissioner of Patents and Trademarks*